(12) United States Patent
Nishikawa

(10) Patent No.: US 8,982,375 B2
(45) Date of Patent: Mar. 17, 2015

(54) IMAGE FORMING APPARATUS AND IMAGE READING APPARATUS HAVING INTERFACE SELECTION FOR POWER SAVING

(75) Inventor: Naoki Nishikawa, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 143 days.

(21) Appl. No.: 13/415,806

(22) Filed: Mar. 8, 2012

(65) Prior Publication Data

US 2012/0274972 A1 Nov. 1, 2012

(30) Foreign Application Priority Data

Apr. 28, 2011 (JP) ................................. 2011-100572

(51) Int. Cl.
- *G06K 15/00* (2006.01)
- *H04N 1/00* (2006.01)
- *G06F 1/32* (2006.01)

(52) U.S. Cl.
CPC ......... *H04N 1/00896* (2013.01); *Y02B 60/1267* (2013.01); *G06K 15/4055* (2013.01); *G06F 1/3284* (2013.01); *G06F 1/3287* (2013.01); *Y02B 60/32* (2013.01); *H04N 2201/0094* (2013.01)
USPC .......... 358/1.14; 713/310; 713/320; 713/323; 713/324

(58) Field of Classification Search
USPC .......................... 358/1.14; 713/310, 324, 340
See application file for complete search history.

(56) References Cited

U.S. PATENT DOCUMENTS

| | | | | |
|---|---|---|---|---|
| 7,496,084 B2 * | 2/2009 | Inoue et al. | ................... | 370/349 |
| 7,500,014 B1 * | 3/2009 | Jacobson et al. | ............... | 709/239 |
| 2004/0027003 A1 * | 2/2004 | Yang | ................................ | 307/39 |
| 2008/0201594 A1 * | 8/2008 | Narushima | ................... | 713/324 |

(Continued)

FOREIGN PATENT DOCUMENTS

| | | |
|---|---|---|
| JP | 2008-204209 A | 9/2008 |
| JP | 2008-300922 A | 12/2008 |

(Continued)

OTHER PUBLICATIONS

Japan Patent Office, Notification of Reasons for Refusal for Japanese Patent Application No. 2011-100572 (counterpart to above-captioned patent application), mailed May 7, 2013 (partial translation).

(Continued)

*Primary Examiner* — Fred Guillermety
*Assistant Examiner* — Edwin S Leland, III
(74) *Attorney, Agent, or Firm* — Baker Botts L.L.P.

(57) ABSTRACT

An image forming apparatus includes: an image forming unit; a power supply controller controls the image forming apparatus to operate in a normal mode and a power saving mode, in which supply of power to the image forming unit is cut off; and a plurality of interfaces that receives a transition command for transitioning from the power saving mode to the normal mode. The power supply controller performs an interface-power supply process of supplying power to at least one interface; a first change process of changing power supply destinations in the interface-power supply process so as to reduce an amount of power supply in the interface-power supply process; and a second change process of changing the power supply destinations in the interface-power supply process after the first change process so as to further reduce the amount of power supply.

16 Claims, 9 Drawing Sheets

(56) References Cited

U.S. PATENT DOCUMENTS

| | | |
|---|---|---|
| 2008/0305743 A1* | 12/2008 | Aithal et al. ............... 455/67.11 |
| 2009/0055673 A1* | 2/2009 | Kitajima ....................... 713/340 |
| 2009/0063877 A1* | 3/2009 | Lewis et al. .................. 713/310 |
| 2009/0235098 A1* | 9/2009 | Matsunaga ................... 713/320 |
| 2011/0161704 A1* | 6/2011 | Yokoyama ................... 713/323 |
| 2011/0302350 A1* | 12/2011 | Hsu et al. ..................... 710/315 |
| 2012/0005243 A1* | 1/2012 | Van der Merwe et al. .... 707/812 |
| 2012/0274973 A1* | 11/2012 | Nishikawa ................... 358/1.14 |
| 2012/0278643 A1* | 11/2012 | Nishikawa ................... 713/323 |
| 2012/0287467 A1* | 11/2012 | Yamano ....................... 358/1.15 |

FOREIGN PATENT DOCUMENTS

| | | |
|---|---|---|
| JP | 2008300922 A * | 12/2008 |
| JP | 2009-225139 A | 10/2009 |

OTHER PUBLICATIONS

Japan Patent Office, Notification of Reasons for Refusal for Japanese Patent Application No. 2011-100572 (counterpart to above-captioned patent application), mailed Dec. 10, 2013.

* cited by examiner

FIG. 10A

Selection of interface to be power cutoff target — 42

Please select interface to be power cutoff target.

- ■ Network IF
- ☐ Fax IF
- ■ Wireless Communication IF
- ☐ USB IF
- ☐ Printer IF

FIG. 10B

Selection of interface to be power cutoff target — 42

Please select interface to be power cutoff target.

- ■ Network IF
- ☐ USB IF
- ☐ Printer IF

IMAGE FORMING APPARATUS AND IMAGE READING APPARATUS HAVING INTERFACE SELECTION FOR POWER SAVING

CROSS-REFERENCE TO RELATED APPLICATIONS

This application claims priority from Japanese Patent Application No. 2011-100572 filed on Apr. 28, 2011, the entire subject matter of which is incorporated herein by reference.

TECHNICAL FIELD

The present invention relates to an image forming apparatus and an image reading apparatus having a power saving mode for suppressing power consumption, and more specifically, to an image forming apparatus and an image reading apparatus having a plurality of interfaces for receiving a transition command for transitioning from a power saving mode to a normal mode.

BACKGROUND

There have been proposed an electronic apparatus such as a printer or a scanner handling an image which, when the electronic apparatus is not used, transitions from a normal mode to a power saving mode, in which some functions are deactivated to suppress power consumption, so as to save electric power. When the electronic apparatus operates in the power saving mode, power is not supplied to any interface other than an interface for receiving a transition command for transitioning from the power saving mode to the normal mode.

For example, there have been proposed a printer, which has a plurality of interfaces for receiving the transition command, and which is configured to select some interfaces to be used among the plurality of interfaces according to automatic selection, user's designation, a frequency of use, or the like, and not to supply power to interfaces except for the selected interfaces.

SUMMARY

Illustrative aspects of the present invention provide an image forming apparatus and an image reading apparatus which is capable of saving electric power while avoiding usability getting worse suddenly.

BRIEF DESCRIPTION OF THE DRAWINGS

FIGS. 10A and 10B are views illustrating screens for selecting an interface to be a power cutoff target.

DETAILED DESCRIPTION

Figure 1:
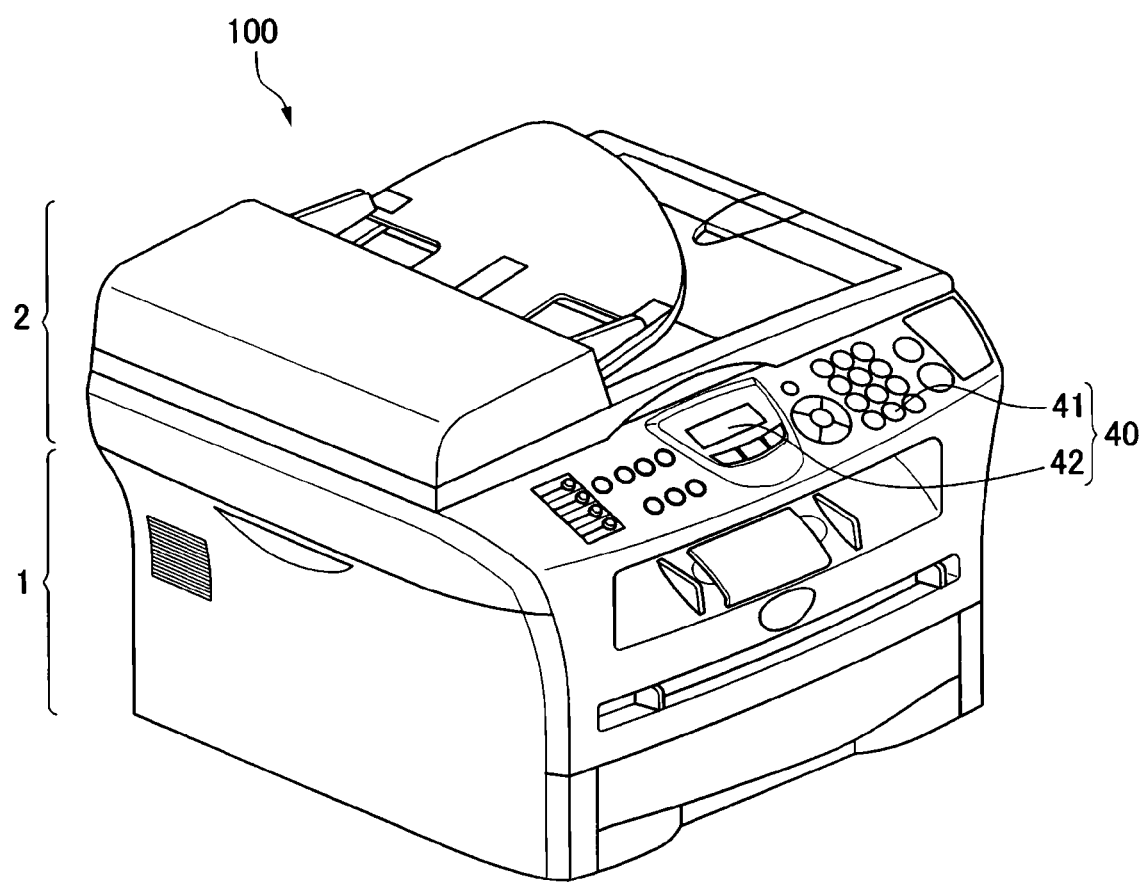
FIG. 1 is a perspective view illustrating an appearance of a multi-function peripheral (MFP)

<General Overview>
In the above-described related-art printer, if a selection condition is satisfied, available interfaces are drastically limited at once. Thus, usability suddenly gets worse. Selecting more interfaces for avoiding that problem is against saving electric power.

Therefore, illustrative aspects of the present invention provide an image forming apparatus and an image reading apparatus which is capable of saving electric power while avoiding usability getting worse suddenly.

According to a first illustrative aspect of the present invention, there is provided an image forming apparatus comprising: an image forming unit configured to form an image; a power supply controller configured to control the image forming apparatus to operate in a power saving mode, in which supply of power to the image forming unit is cut off, and a normal mode, in which supply of power to the image forming unit is performed, wherein the power supply controller is configured to be switched between the power saving mode and the normal mode; and a plurality of interfaces configured to receive a transition command for transitioning from the power saving mode to the normal mode, wherein the power supply controller is configured to perform: an interface-power supply process of supplying power to at least one interface among the plurality of interfaces; a first change process of changing power supply destinations in the interface-power supply process so as to reduce an amount of power supply in the interface-power supply process; and a second change process of changing the power supply destinations in the interface-power supply process after the first change process so as to further reduce the amount of power supply as compared to the amount of power supply after the first change process.

The image forming apparatus of the present invention has the power saving mode and the normal mode as modes for controlling supply of power to the image forming unit. Further, the image forming apparatus has the plurality of interfaces capable of receiving a transition command for transitioning from the power saving mode to the normal mode. The image forming apparatus of the present invention changes the power supply destinations of the interface power supply unit for reducing the amount of power supply of the interface power supply unit, as the first change process. After the first change process, the image forming apparatus changes the power supply destinations of the interface power supply unit for further reducing the amount of power supply of the interface power supply unit, as the second change process.

In other words, in the image forming apparatus of the present invention, the status of supply of power to each interface changes in at least two stages including the first change process and the second change process so as to reduce the amount of power supply. That is, supply of power to all interfaces is not suddenly cut off, but the power supply destinations are controlled in stages, so as to gradually reduce the amount of power supply to the interfaces. Therefore, it is possible to avoid usability getting worse suddenly. In addition, since the power supply destinations are changed to reduce the amount of power supply, electric power is saved.

According to a second illustrative aspect of the present invention, in the image forming apparatus, wherein the power supply controller is configured to, when performing the first change process and the second change process, change the power supply destinations in the interface-power supply process in accordance with preset priorities.

According thereto, it is possible to more appropriately change the power supply destinations in accordance with a frequency of user's use or power consumption of each interface, as compared to a case of randomly changing the power supply destinations. For example, the priorities may be priorities according to which the interfaces will be used, or may be priorities according to which power supply will be cut off.

According to a third illustrative aspect of the present invention, in the image forming apparatus, wherein the priorities are updated according to a frequency of use of each interface.

If the frequency of use is reflected to each priority for determining the power supply destination, it is possible to improve usability.

According to a fourth illustrative aspect of the present invention, in the image forming apparatus, wherein a priority of a lately used interface is updated so as to be easily selected as the power supply destination. According to a fifth illustrative aspect of the invention, in the image forming apparatus, wherein the priority of the lately used interface is updated to higher priority than priorities of other interfaces as the power supply destination.

The lately used interface is likely to be used again. For this reason, if power is supplied to the lately used interface such that the lately used interface is available, it is possible to improve usability.

According to a sixth illustrative aspect of the present invention, in the image forming apparatus, wherein in a case where a duration when the image forming apparatus is not used is equal to or longer than a first threshold time period, the power supply controller performs the first change process, and wherein in a case where the duration is equal to or longer than a second threshold time period longer than the first threshold time period, the power supply controller performs the second change process.

As a time period when the image forming apparatus is not used increases, the need for transitioning from the power saving mode to the normal mode decreases. Therefore, if conditions for performing the first change process and the second change process are determined according to the duration when each operating interface is not used, it is possible to further improve usability.

According to a seventh illustrative aspect of the present invention, in the image forming apparatus, wherein the first threshold time period is shorter than a time period obtained by subtracting the first threshold time period from the second threshold time period.

According thereto, since the supply of power to interfaces is cut off earlier, it is possible to further save power consumption.

According to an eighth illustrative aspect of the present invention, in the image forming apparatus, wherein at least one of the first threshold time period and the second threshold time period is updated according to a frequency of use of the image forming apparatus.

Since at least one of the first threshold time period and the second threshold time period can be updated according to the frequency of use, for example, in a case where the frequency of use is low, it is possible to reduce at least one of the first threshold time period and the second threshold time period, thereby reducing the amount of power supply earlier. Also, for example, in a case where the frequency of use is high, it is possible to extend at least one of the first threshold time period and the second threshold time period for waiting for user's use for a long time.

According to a ninth illustrative aspect of the present invention, in the image forming apparatus, wherein the power supply controller reduces the number of interfaces that receive power in the interface-power supply process by the first change process, and wherein the power supply controller further reduces the number of interfaces that receive power in the interface-power supply process by the second change process.

According thereto, the control becomes simple. Further, the user can easily grasp the operation.

According to a tenth illustrative aspect of the present invention, in the image forming apparatus, wherein in at least one of the first change process and the second change process, the power supply controller allows a user to select interfaces to receive power in the interface-power supply process so as to reduce the total amount of power to be supplied in the interface-power supply process. According to an eleventh illustrative aspect of the invention, in the image forming apparatus, wherein the power supply controller allows the user to reduce the number of interfaces that receive power in the interface-power supply process in the first change process, and wherein the power supply controller allows the user to further reduce the number of interfaces that receive power in the interface-power supply process in the second change process.

According thereto, when the power supply destinations are changed, user's intention can be reflected.

According to a twelfth illustrative aspect of the present invention, there is provided an image reading apparatus comprising: an image reading unit configured to read an image; a power supply controller configured to control the image reading apparatus to operate in a power saving mode, in which supply of power to the image reading unit is cut off, and a normal mode, in which supply of power to the image reading unit is performed, wherein the power supply controller is configured to be switched between the power saving mode and the normal mode; and a plurality of interfaces configured to receive a transition command for transitioning from the power saving mode to the normal mode, wherein the power supply controller is configured to perform: an interface-power supply process of supplying power to at least one interface among the plurality of interfaces; a first change process of changing power supply destinations in the interface-power supply process so as to reduce an amount of power supply in the interface-power supply process; and a second change process of changing the power supply destinations in the interface-power supply process after the first change process so as to further reduce the amount of power supply as compared to the amount of power supply after the first change process.

According to a thirteenth illustrative aspect of the invention, there is provided a multi-function peripheral comprising: an image forming unit configured to form an image; an image reading unit configured to read an image; a power supply controller configured to control the multi-function peripheral to operate in a power saving mode, in which supply of power to the image forming unit and the image reading unit is cut off, and in a normal mode, in which supply of power to the image forming unit and the image reading unit is performed; and a plurality of interfaces configured to receive a transition command for transitioning from the power saving mode to the normal mode, wherein the power supply controller is configured to perform: an interface-power supply process of supplying power to at least one interface among the plurality of interfaces; a first change process of changing power supply destinations in the interface-power supply process so as to reduce an amount of power supply in the interface-power supply process; and a second change process of changing the power supply destinations in the interface-power supply process after the first change process so as to further reduce the amount of power supply as compared to the amount of power supply after the first change process.

According to the illustrative aspects of the present invention, it is possible to implement an image forming apparatus and an image reading apparatus which is capable of saving electric power while avoiding usability getting worse suddenly.

<Exemplary Embodiments>

Hereinafter, exemplary embodiments of the present invention will be described in detail with reference to the accompanying drawings. The exemplary embodiments may be implemented by applying the present invention to a multifunction peripheral (MFP) having a power saving mode for suppressing power consumption.

[Configuration of MFP]

As shown in FIG. 1, an MFP 100 according to the exemplary embodiment includes an image forming unit 1 for printing an image on a paper sheet, and an image reading unit 2 for reading an image of a document. The image forming type of the image forming unit 1 may be an electrographic type or an ink-jet type. Also, the image forming unit 1 may be capable of forming color images, or may be capable of forming only monochrome images.

The MFP 100 includes an operation panel 40 on a front side thereof. The operation panel 40 includes a button group 41 including various buttons (for example, a start key, a stop key, and individual buttons of a numeric keypad), and a display unit 42 that is composed of a liquid crystal display. The button group 41 and the display unit 42 enable display of an operation status, and allow a user to perform input operation.

Further, the MFP 100 includes various interfaces for receiving signals from outside. When the MFP 100 operates in the power saving mode, if receiving a transition command through an interface, the MFP 100 switches a mode regarding power supply from the power saving mode to a ready mode (one example of a normal mode). Incidentally, the power saving mode can also be released by operating the operation panel 40. In other words, the operation panel 40 is one of the interface capable of receiving a transition command for transitioning from the power saving mode to the ready mode. Various interfaces and various modes will be described below.

[Electrical Configuration of MFP]

Figure 2:
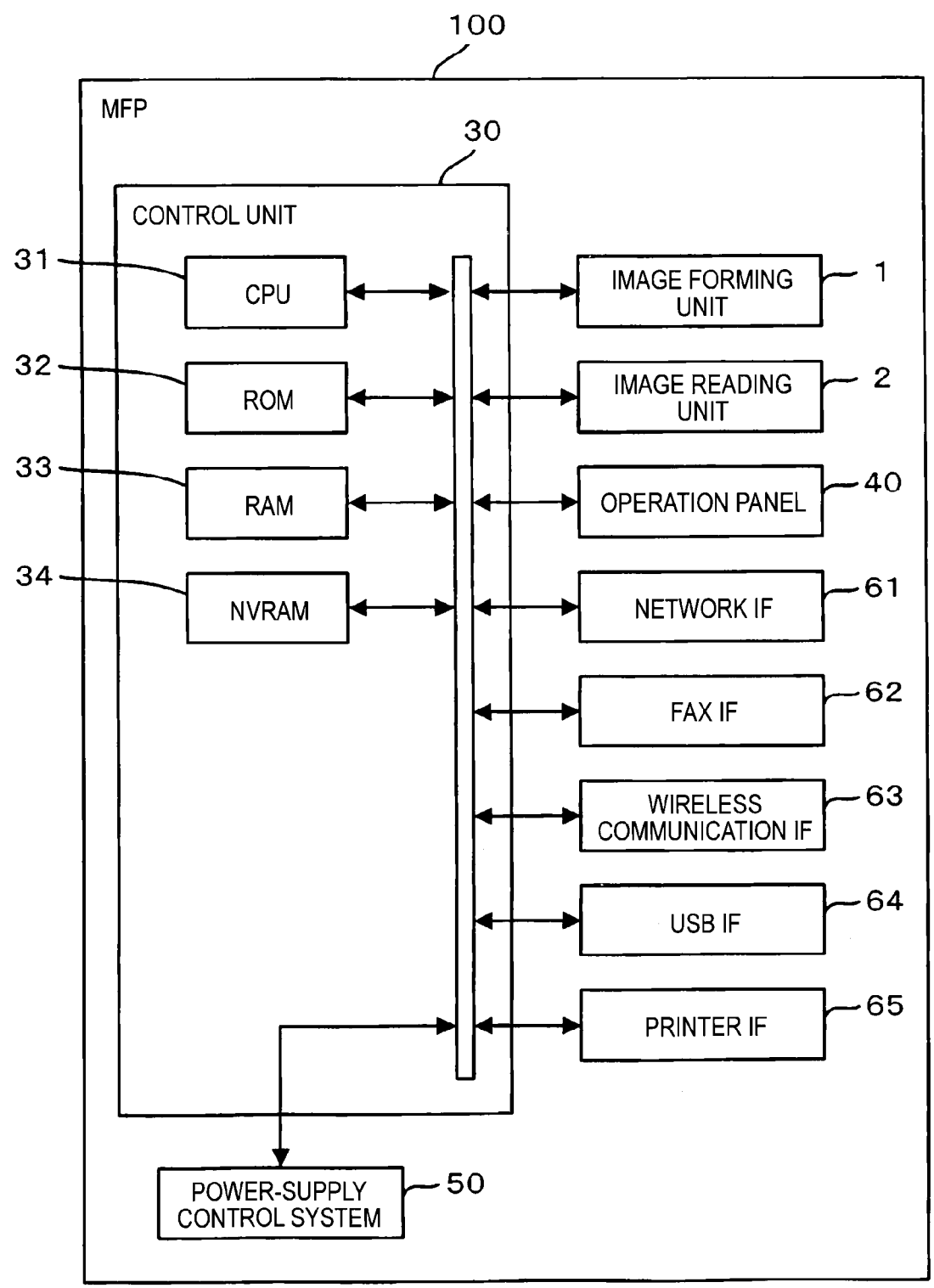
FIG. 2 is a block diagram illustrating an electrical configuration of the MFP shown in FIG. 1.

Subsequently, an electrical configuration of the MFP 100 will be described. As shown in FIG. 2, the MFP 100 includes a control unit 30 including a CPU 31, a ROM 32, a RAM 33, and a non-volatile RAM (NVRAM) 34.

The control unit 30 is electrically connected to the image forming unit 1, the image reading unit 2, the operation panel 40, a power-supply control system 50 for controlling supply of power to each component, and various interfaces such as a network interface 61, a fax interface 62, a wireless communication interface 63, a USB interface 64, and a printer interface 65. For example, the control unit 30 acquires a signal of image data from the image reading unit 2. Further, the control unit 30 outputs a signal for generating a desired image, to the image forming unit 1. Furthermore, the control unit 30 receives signals of various buttons from the button group 41. Moreover, the control unit 30 outputs a signal of contents to be displayed, to the display unit 42.

The ROM 32 stores various control programs for controlling the MFP 100, image processing programs, various options, initial values, and so on. The RAM 33 is used as a work area into which various control programs are read, or as a storage area for temporarily storing image data of a document read by the image reading unit 2 or image data received through various interfaces. The NVRAM 34 is a non-volatile storage means, and is used as a storage area for storing various options, image data, and so on.

The CPU 31 performs operations for implementing various functions, such as an image reading function and an image forming function, in the MFP 100. The CPU 31 functions as a center for control. The CPU 31 stores process results in the RAM 33 or the NVRAM 34 in accordance with control programs read from the ROM 32 and controls each component of the MFP 100.

The network interface 61 is connected to a network, such that the MFP 100 can perform data communication with other information processing apparatuses through the network interface 61. The fax interface 62 is connected to a public line, such that the MFP 100 can perform data communication with an external facsimile and the like, through the fax interface 62. The wireless communication interface 63 establishes wireless communication with other information processing apparatuses, such that the MFP 100 can perform data communication with those information processing apparatuses. The USB interface 64 is directly connected to a USB memory or another information device (such as a card reader), such that the MFP 100 can perform data communication with that information device or the like through the USB interface 64. The printer interface 65 is connected to a printer cable, such that the MFP 100 can perform data communication with another information processing apparatus through the printer interface 65.

[Power Supply Control]

Figure 3:
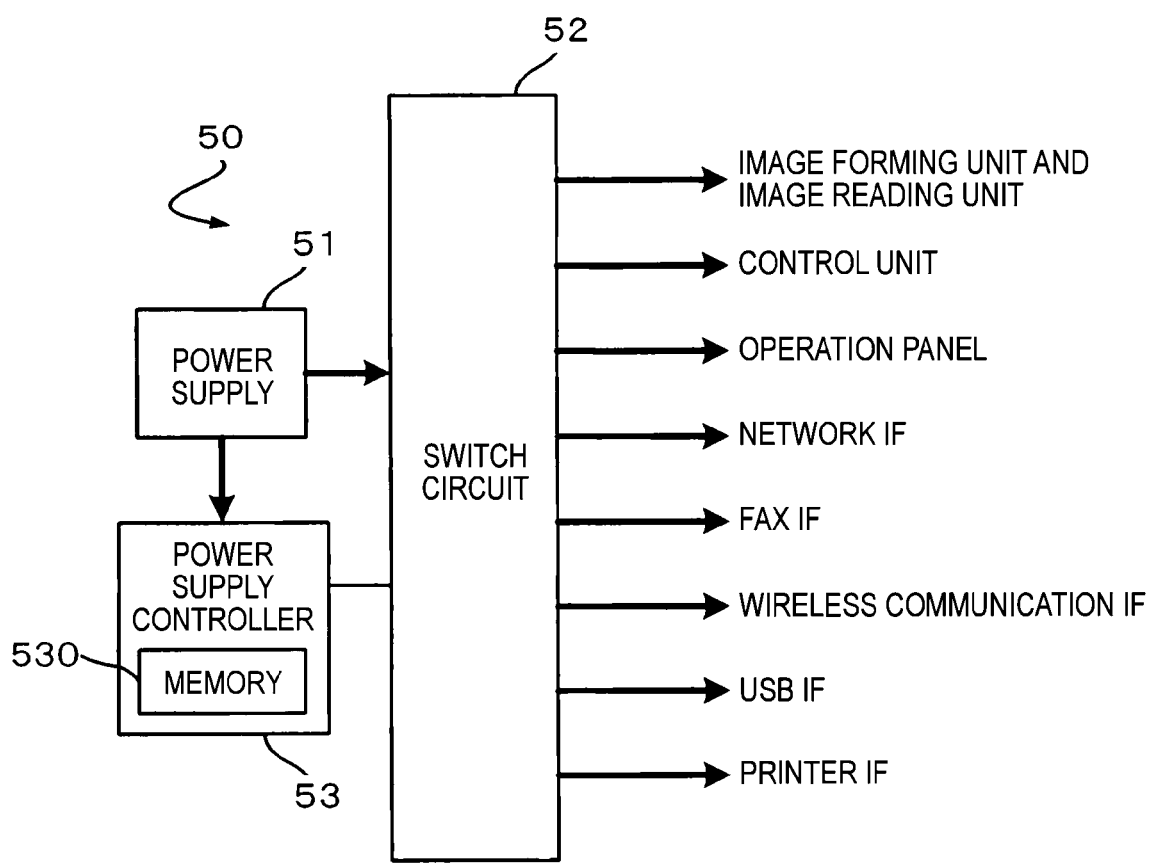
FIG. 3 is a block diagram illustrating a configuration of a power-supply control system.

Subsequently, power supply control of the MFP 100 will be described. As shown in FIG. 3, the MFP 100 includes a power supply 51, a switch circuit 52 for distributing power supplied from the power supply 51, to various components of the MFP 100, and a power supply controller 53 for turning on or off each of various switches of the switch circuit 52, as the power-supply control system 50 (one example of a power supply controller). The power supply controller 53 operates independently from the control unit 30. The power supply controller 53 includes a CPU and a memory on its own.

The power supply 51 is composed of a circuit which is connected to, for example, a commercial power supply or a battery. The power supply 51 converts the supplied power into appropriate power and supplies the converted power to each of the components of the MFP 100. The switch circuit 52 switches whether to supply power to each of the components of the MFP 100, on the basis of a command output from the power supply controller 53. Specifically, the MFP 100 has various power supply systems such as a power supply system for the image forming unit 1 and the image reading unit 2, a power supply system for the control unit 30, a power supply system for the operation panel 40, and a power supply system for various interfaces. The switch circuit 52 supplies or cuts off power to each power supply system.

Now, modes of the power-supply control system 50 will be described. The power-supply control system 50 has a ready mode, in which an image can be read or printed, and a power saving mode, in which any image can not be read or printed. Specifically, in the ready mode, power is supplied to all of the image forming unit 1, the image reading unit 2, the control unit 30, the operation panel 40, and the interfaces 61 to 65, such that a printing operation or a scanning operation becomes possible. On the other hand, in the power saving mode, supply of power to the image forming unit 1 and the image reading unit 2 is cut off, so that printing and reading becomes impossible.

Immediately after the power-supply control system 50 is activated, the power-supply control system 50 operates in the ready mode. Then, in a case where the printing, reading, and user's operation are not performed and duration in which the MFP 100 is not used (hereinafter, referred to as an 'idle time period') is a predetermined time period or more, or in a case where a forced transition command for forcedly performing transition to the power saving mode is input, the power-supply control system 50 transitions from the ready mode to the power saving mode.

Further, in the power saving mode, the power-supply control system 50 receives a transition command for transitioning to the ready mode. In the power saving mode, the power-supply control system 50 cuts off the supply to the interfaces 61 to 65 in stages. Therefore, in the power saving mode, interfaces capable of receiving a transition command decreases in stages. If receiving a transition command, the power-supply control system 50 transitions from the power saving mode to the ready mode. The reception of the transition command may correspond to operation of the user on the operation panel 40, reception of a signal corresponding to the transition command from another information processing apparatus, or installation of an information device. The reception of the transition command may correspond to reception of a job from another information processing apparatus.

In the description of the exemplary embodiment, interfaces (i.e., the operation panel 40 and the interfaces 61 to 65 in the exemplary embodiment) capable of receiving a transition command are referred to as an 'IF for return.' Also, an IF for return to which power is continuously supplied in the power saving mode is referred to as an 'operating IF,' and an IF for return to which power is not supplied in the power saving mode is referred to as an 'idle IF.'

Whenever the mode of the power supply controller 53 is changed, a signal for supplying or cutting off power to each of various power supply systems is input to the switch circuit 52. The power supply controller 53 receives power directly from the power supply 51 and always operates even in the power saving mode. Therefore, it is possible to control the switch circuit 52 even in the power saving mode.

Figure 4:
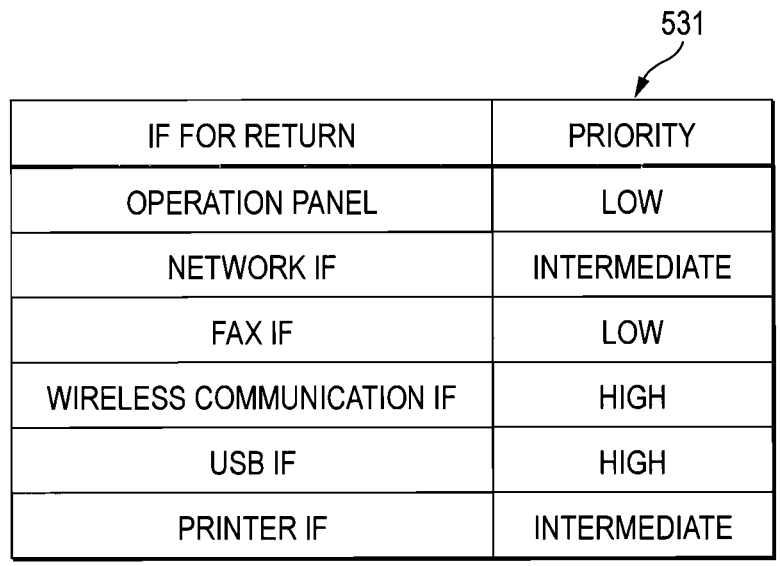
FIG. 4 is a view illustrating an example of a database storing priorities in association with interfaces.
Figure 5:
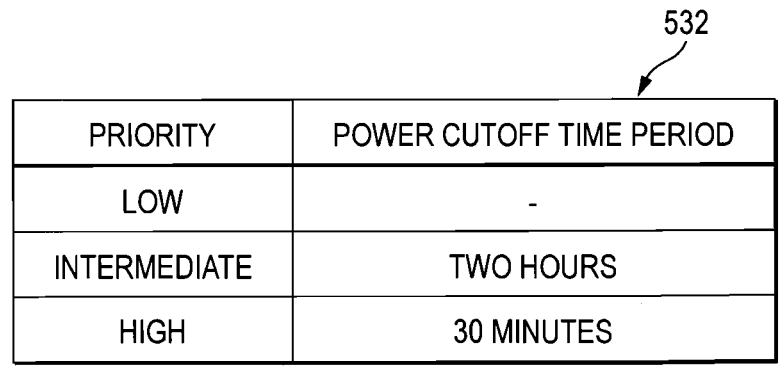
FIG. 5 is a view illustrating an example of a database storing cutoff time periods in association with the priorities.

Further, the power supply controller 53 measures the idle time period. Then, the power supply controller 53 changes the status of supply of power to each IF for return in accordance with the length of the idle time period. Specifically, the power supply controller 53 determines IFs for return to be power cutoff targets on the basis of the length of the idle time period and priorities assigned to the IFs for return. Thus, the power supply controller 53 includes a database 531 and a database 532 in its own memory 530. The database 531 stores the priorities in association with the IFs for return as shown in FIG. 4; and the database 532 stores power cutoff time periods in association with the priorities, as shown in FIG. 5. Then, in a case where the idle time period is equal to or longer than a power cutoff time period defined in the database 532, supply of power to an IF for return having a priority corresponding to that power cutoff time period is cut off.

In the exemplary embodiment, the priorities have three levels, that is, a high level, an intermediate level, and a low level. A high priority means a high power cutoff priority, and a low priority means a low power cutoff priority.

A symbol '-' registered as a power cutoff time period means that any power cutoff time period has not been set. In the exemplary embodiment, an IF for return having a priority associated with the symbol '-' registered as the power cutoff time period does not become a power cutoff target. Incidentally, if all of the IFs for return are set as the idle IFs, there is no interface for receiving a transition command, so that it becomes difficult to release the power saving mode. For this reason, it is preferable to set an IF for return to which power is supplied even in the power saving mode such that the IF for return can always receive a transition command. In the exemplary embodiment, the symbol '-' has been registered as the power cutoff time period associated with a low priority.

The registered contents regarding the priorities and the power cutoff time periods may be appropriately updated according to a power saving process or a regularly updating process (to be described below). The registered contents regarding the priorities and the power cutoff time periods may be stored in the databases 531 and 532 before shipping. Additionally, the registered contents regarding the priorities and the power cutoff time periods may be updated according to a user's input.

[First Exemplary Embodiment]
[Power Saving Process]

Subsequently, the procedure of the power saving process (one example of a changing process) for implementing an operation of changing power supply destinations in the power saving mode will be described with reference to a flow chart of FIG. 6. If a condition for transitioning to the power saving mode is satisfied, the power saving process is performed by the power supply controller 53. A case where the condition for transitioning to the power saving mode is satisfied may correspond to a case where the idle time period is equal to or longer than a predetermined time period, for example.

In the power saving process of the first exemplary embodiment, first, in STEP S101, supply of power to the image forming unit 1 and the image reading unit 2 is cut off. Specifically, a switch connected to the power supply system for the image forming unit 1 and a switch connected to the power supply system for the image forming unit 1 are turned off. Incidentally, in STEP S101, the supply of power to the control unit 30 may be cut off. Since the power supply controller 53 performing the power saving mode operates independent from the control unit 30, even if the supply of power to the control unit 30 is cut off, the power supply controller 53 continues to perform the power saving mode. The supply of power to the IFs for return continues.

Figure 7:
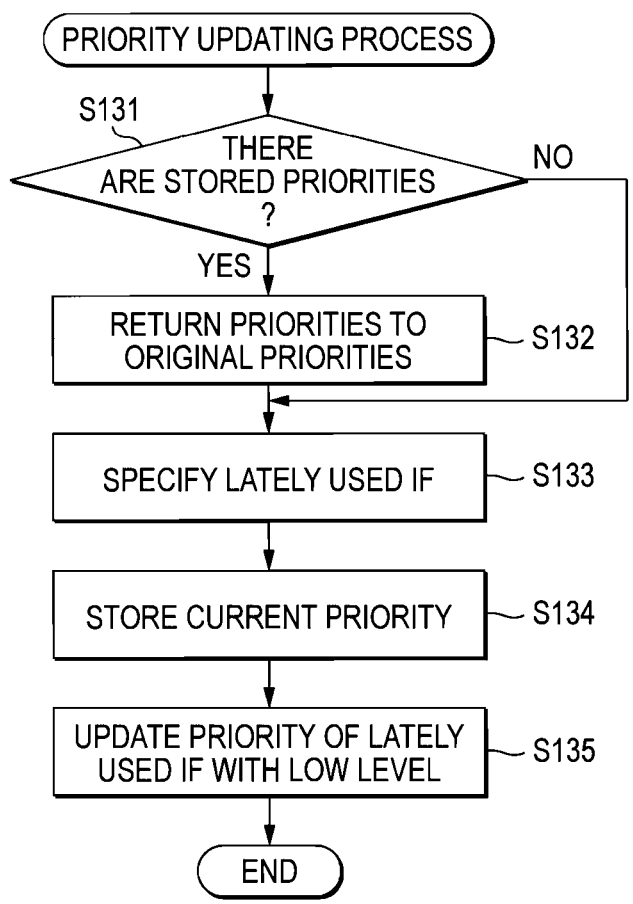
FIG. 7 is a flow chart illustrating a procedure of a priority changing process according to the first exemplary embodiment.

Next, in STEP S102, a priority updating process for updating the priorities of the IFs for return stored in the database 531 is performed. FIG. 7 is a flow chart illustrating the procedure of the priority updating process of STEP S102.

In the priority updating process of STEP S102, first, in STEP S131, it is determined that there is stored priority information. Here, in the previous priority updating process, the IFs for return and their priorities have been stored in STEP S134 (to be described below) if the priorities of the IFs for return have then been updated in STEP S135 (to be described below). Therefore, in a case where there are stored priorities (YES in STEP S131), in STEP S132, the stored priorities are read, and the updated priorities of the IFs for return updated in the previous priority updating process are returned to the previous priorities.

After STEP S132, or in a case where there are no stored priorities (NO in STEP S131), in STEP S133, a lately used interface is specified from the IFs for return. Here, examples of use include transmission or reception of data or the like in a case of an interface for transmitting or receiving data and a command, for example; and user's operation in a case of the operation panel 40. The power supply controller 53 stores what is the lately used IF for return, in its own memory 530, and updates information on the lately used IF for return whenever an IF for return is used. The power supply controller 53 specifies the lately used IF for return, on the basis of the information stored in the memory 530.

Next, in STEP S134, the current priority of the IF for return specified in STEP S133 is stored. Then, in STEP S135, the priority of the IF for return is updated with the low level. That is, since it is supposed that the frequency of use of the lately used IF for return is high, the power cutoff priority is lowered such that the lately used interface IF for return can easily receive a transition command. After STEP S135, the priority updating process finishes.

Figure 6:
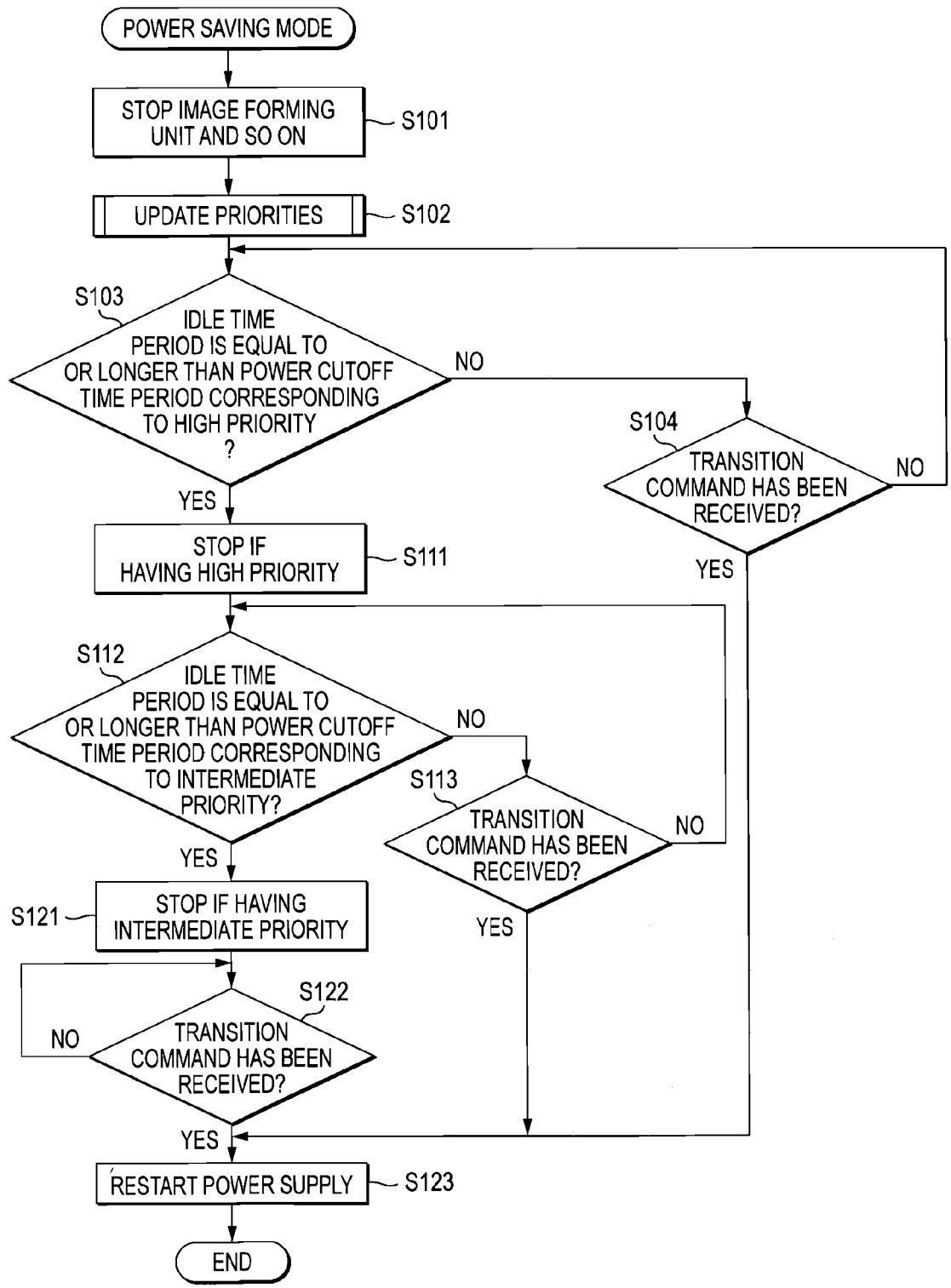
FIG. 6 is a flow chart illustrating a procedure of a power saving process according to a first exemplary embodiment.

Returning to the description of FIG. 6, after STEP S102, in STEP S103, it is determined whether the idle time period is equal to or longer than a power cutoff time period (one example of a first threshold time period), corresponding to a high priority, of the power cutoff time periods stored in the database 532. For example, in FIG. 5, since '30 minutes' have been set as a power cutoff time period corresponding to a high priority, it is determined whether the idle time period is equal to or longer than 30 minutes.

In a case where the idle time period is shorter than the power cutoff time period corresponding to the high priority (NO in STEP S103), in STEP S104, it is determined whether any transition command has been received through an operating IF. In a case where any transition command has not been received (NO in STEP S104), the power saving process returns to STEP S103.

In a case where the idle time period is equal to or longer than the power cutoff time period corresponding to the high priority (YES in STEP S103), in STEP S111, the supply of power to the IF for return having the high priority is cut off (one example of a first change process). For example, the supply of power to the wireless communication interface 63 and the USB interface 64 having high priorities in FIG. 4 is cut off. Therefore, the number of operating IFs decreases, and thus the amount of power supply decreases.

Incidentally, in a case where a time period that is shorter than a predetermined time period which is a condition for transitioning to the power saving mode has been registered as a power cutoff time period corresponding to the high priority, STEP S111 is performed immediately after transition to the power saving mode. With respect to an IF for return which is very unlikely to receive a transition command, or with respect to an IF for return which consumes a large amount of power supply, in order to suppress the power consumption, a time period (for example, '0') shorter than the predetermined time period which is the condition for transitioning to the power saving mode may be set as the power cutoff time period corresponding to the high priority, for example, and the power supply may be cut off immediately after transition to the power saving mode.

After STEP S111, in STEP S112, it is determined whether the idle time period is equal to or longer than a power cutoff time period (one example of a second threshold time period), corresponding to an intermediate priority, of the power cutoff time periods stored in the database 532. For example, since 'two hours' have been set as the power cutoff time period corresponding to the intermediate priority in FIG. 5, it is determined whether the idle time period is equal to or longer than two hours.

In a case where the idle time period is shorter than the power cutoff time period corresponding to the intermediate priority (NO in STEP S112), in STEP S113, it is determined whether any transition command has been received through an operating IF. In a case where any transition command has not been received (NO in STEP S113), the power saving process returns to STEP S112.

In a case where the idle time period is equal to or longer than the power cutoff time period corresponding to the intermediate priority (YES in STEP S112), in STEP S121, the supply of power to the IF for return having the intermediate priority is cut off (one example of a second change process). For example, the supply of power to the network interface 61 and the printer interface 65 having the intermediate priorities in FIG. 4 are cut off. Therefore, the number of operating IFs further decreases, and thus the amount of power supply further decreases.

After STEP S121, in STEP S122, it is determined whether any transition command has been received through an operating IF. In a case where any transition command has not been received (NO in STEP S122), the power supply controller 53 stands by until any transition command is received.

In a case where a transition command has been received (YES in STEP S104, STEP S113, or STEP S122), in STEP S123, the supply of power to the image forming unit 1, the image reading unit 2, the control unit 30, and all IFs for return restarts. Therefore, transition to the ready mode is performed. After STEP S123, the power saving process finishes.

According to the power saving process of the first exemplary embodiment, in the power saving mode, the IFs for return which are the power supply destinations are changed in a plurality of stages. For example, if information as shown in FIGS. 4 and 5 has been registered in the databases 531 and 532, respectively, immediately after the transition to the power saving mode, the supply of power to the image forming unit 1 and the image reading unit 2 is cut off, but the supply of power to the IFs for return continues. Then, if the idle time period is equal to or longer than 30 minutes, the supply of power to the wireless communication interface 63 and the USB interface 64 having the high priorities is cut off. Next, if the idle time period equal to or longer than two hours, the supply of power to the network interface 61 and the printer interface 65 having the intermediate priorities is cut off. As described above, in the power saving process of the first exemplary embodiment, since the number of operating IFs decreases according to the length of the idle time period, it possible to reduce the power consumption of the entire apparatus.

Incidentally, in the first exemplary embodiment, since the symbol '-' has been assigned as the power cutoff time period corresponding to the low priority, determination as to whether the idle time period is equal to or longer than the power cutoff time period corresponding to the low priority is omitted. However, in a case where an appropriate time period is assigned as the power cutoff time period corresponding to the low priority, after STEP S121, it is determined whether the idle time period is equal to or longer than the power cutoff time period corresponding to the low priority. Then, in a case where the idle time period is equal to or longer than the power cutoff time period corresponding to the low priority, the supply of power to the IFs for return having the low priorities is cut off.

In the first exemplary embodiment, the priorities are handled as power cutoff priorities. However, the priorities may be power-supply continuation priorities. Also, in the first exemplary embodiment, the priorities have three levels. However, the priorities are not limited to the three levels. For example, the priorities may have two levels, or four or more levels.

[Regularly Updating Process]

Figure 8:
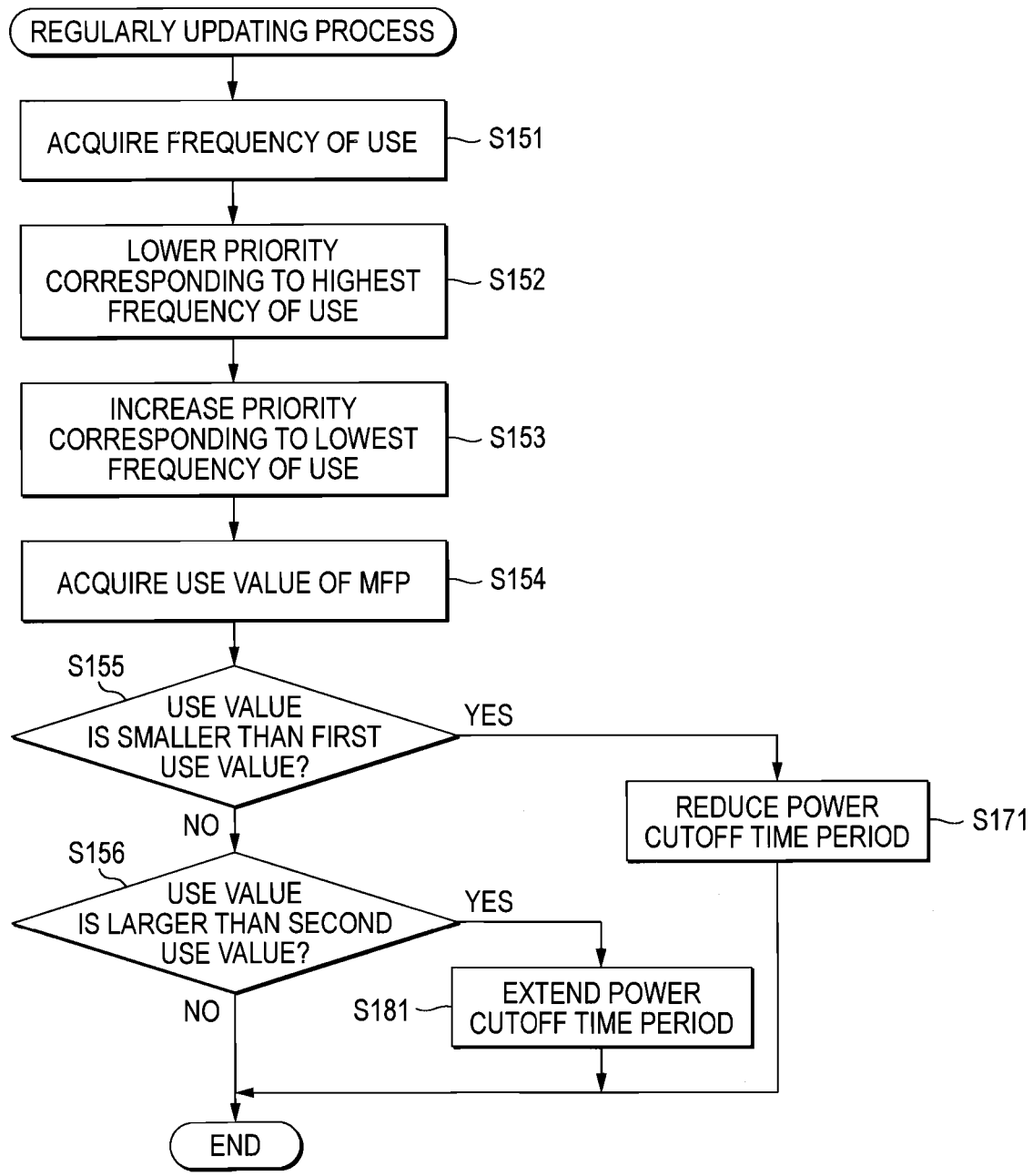
FIG. 8 is a flow chart illustrating a procedure of a regularly updating process according to the first exemplary embodiment.

Subsequently, a procedure of the regularly updating process for regularly updating the priorities and the power cutoff time periods will be described with reference to a flow chart of FIG. 8. The regularly updating process is performed regularly (for example, every 24 hours) by the power supply controller 53.

In the regularly updating process, first, in STEP S151, the frequency of use of each IF for return is acquired. The power supply controller 53 has the frequency of use of each IF for return other than that of the operation panel 40 stored in its own memory 530. The power supply controller 53 reads the frequency of use of each IF for return from the memory 530. Incidentally, as the frequency of use, the number of times of access or the number of processes within a predetermined time period, the lately used date and time, or the like can be applied.

Next, in STEP S152, a priority stored in association with the IF for return having the highest frequency of use in the database 531 is lowered by one level. That is, if the stored priority in association with the IF for return having the highest frequency of use is 'high,' the stored priority is updated with 'intermediate'; and if the stored priority in association with the IF for return having the highest frequency of use is 'intermediate,' the stored priority is updated with the 'low.' Incidentally, if the stored priority in association with the IF for return having the highest frequency of use is 'low,' the stored priority is not updated.

Next, in STEP S153, a priority stored in association with the IF for return having the lowest frequency of use in the database 531 is increased by one level. That is, if the stored priority in association with the IF for return having the lowest frequency of use is 'low,' the stored priority is updated with 'intermediate'; and if the stored priority in association with the IF for return having the lowest frequency of use is 'intermediate,' the stored priority is updated with 'high.' Incidentally, if the stored priority in association with the IF for return having the lowest frequency of use is 'high,' the stored priority is not updated.

Next, in STEP S154, a use value of the MFP 100 is acquired. The power supply controller 53 has the use value of the entire MFP 100 stored in its own memory 530. The power supply controller 53 reads the use value of the MFP 100 from the memory 530. Incidentally, as the use value, the number of times of access or the number of processes within a predetermined time period, the lately used date and time, or the like can be applied. In the present exemplary embodiment, the use value is the number of times of access within the predetermined time period, and a large use value means a high frequency of use.

Next, in STEP S155, it is determined whether the use value is smaller than a first use value. In a case where the use value is smaller than the first use value (YES in STEP S155), since it can be determined that the MFP 100 is unlikely to be used, in STEP S171, each power cutoff time period stored in the database 532 is reduced. For example, each power cutoff time period is reduced by α, and the reduced power cutoff time period is stored as a new power cutoff time period. Therefore, it is possible to cut off the supply of power to each IF for return earlier, to prioritize the supply power saving. Incidentally, only a power cutoff time period corresponding to the high priority may be reduced by α. In other words, in a case where the MFP 100 is not used, first, the reduction in operating IFs in the first stage may be performed early.

In a case where the use value is not smaller than the first use value (NO in STEP S155), in STEP S156, it is determined whether the use value is larger than a second use value. The second use value is a value larger than the first use value. In a case where the use value is larger than the second use value (YES in STEP S156), since it can be determined that the MFP 100 is likely to be used even after transition to the power saving mode, in STEP S181, each power cutoff time period stored in the database 532 is extended. For example, each power cutoff time period is extended by β, and the extended power cutoff time period is stored as a new power cutoff time period. Therefore, in order to prioritize usability, it can be delayed to cut off the supply of power to each IF for return. Incidentally, only a power cutoff time period corresponding to the high priority may be extended by β. In other words, in a case where the MFP 100 is frequently used, first, the reduction in the operating IFs in the first stage may be delayed.

After STEP S171 or STEP S181, or in a case where the use value is not larger than the second use value (NO in STEP S156), the regularly updating process finishes. According to this regularly updating process, it is possible to update the priorities and the power cutoff time periods with more appropriate values, considering the status of use of each IF for return or the entire MFP 100.

[Second Exemplary Embodiment]
[Power Saving Process]

Figure 9:
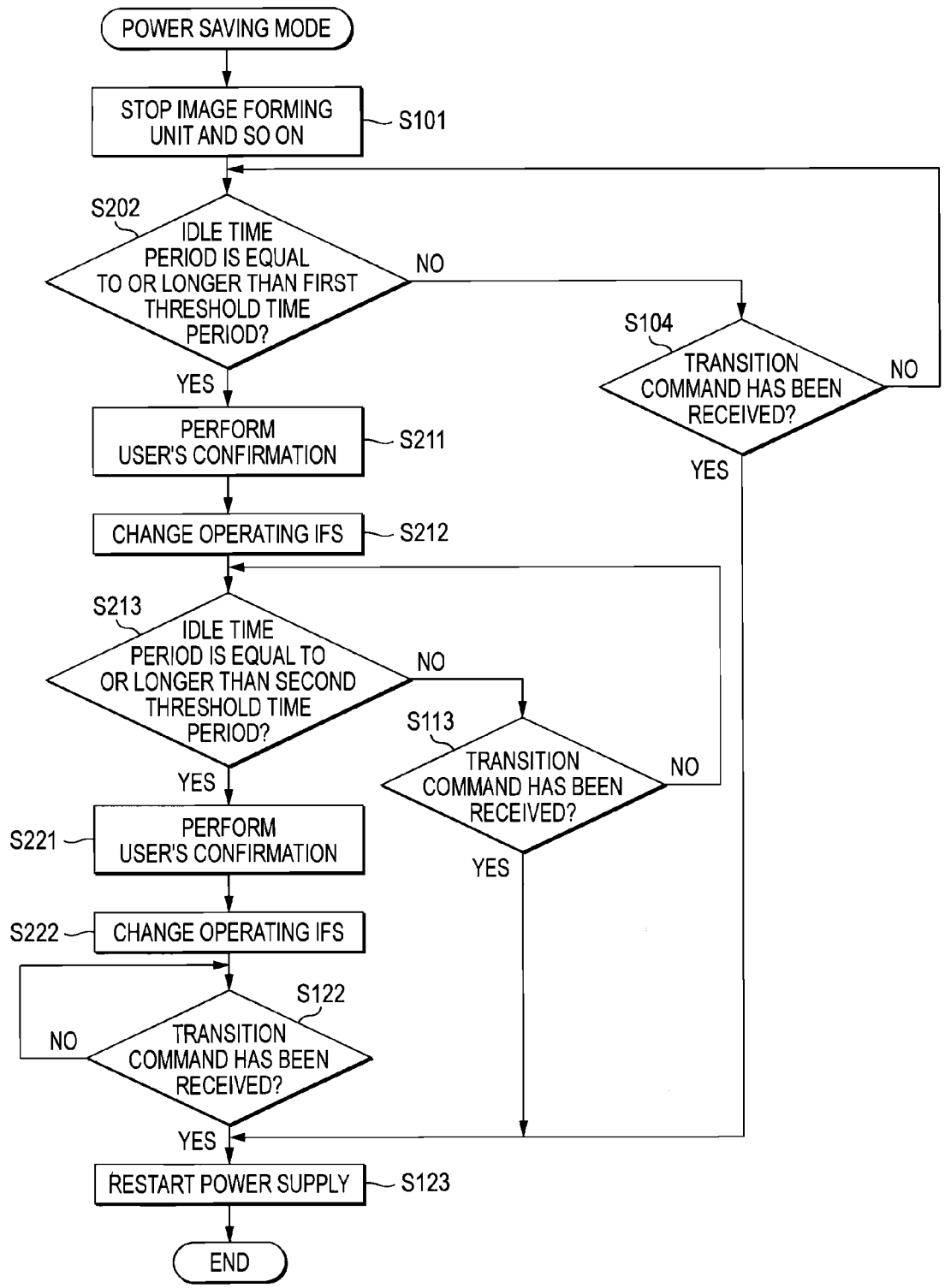
FIG. 9 is a flow chart illustrating a procedure of a power saving process according to a second exemplary embodiment.

Subsequently, a procedure of a power saving mode (one example of a changing process) of a second exemplary embodiment will be described with reference to a flow chart of FIG. 9. In the second exemplary embodiment, the power supply destinations are manually determined by user's selection. This point is different from the first exemplary embodiment in which the power supply destinations are automatically determined according to the contents of the databases 531 and 532. The MFP 100 may perform the power saving process of the second exemplary embodiment, instead of the power saving mode of the first exemplary embodiment. Incidentally, in the following description, processes identical to those of the first exemplary embodiment are denoted by the same reference symbols, and the description thereof will be omitted.

In the power saving process of the second exemplary embodiment, since the power supply destinations are determined by a user's input, the priorities are not used. Further, since user's confirmation is regularly performed after transition to the power saving mode, the power cutoff time periods are also not used. Therefore, the power supply controller 53 may not have the databases 531 and 532.

In the power saving process of the second exemplary embodiment, after the supply of power to the image forming unit 1 and the image reading unit 2 is cut off in STEP S101, in STEP S202, it is determined whether the idle time period is equal to or longer than the first threshold time period, without updating the priorities.

In a case where the idle time period is shorter than the first threshold time period (NO in STEP S202), in STEP S104, it is determined whether any transition command has been received through an operating IF. In a case where any transition command has not been received (NO in STEP S104), the power saving process returns to STEP S202.

In a case where the idle time period is equal to or longer than the first threshold time period (YES in STEP S202), in STEP S211, the operating IFs are listed on the display unit 42 of the operation panel 40 as shown in FIG. 10A, and operating IFs to be power cutoff targets are inquired to the user. As an inquiring means, a confirmation screen may be displayed on the operation panel 40 or an external apparatus. Incidentally, operation on the operation panel 40 while the confirmation screen is being displayed is not regarded as the transition command. After a confirmation result is input, in STEP S212, the supply of power to the selected operating IF is cut off (one example of a first change process).

After STEP S212, in STEP S213, it is determined whether the idle time period is equal to or longer than the second threshold time period. The second threshold time period is longer than the first threshold time period. In a case where the idle time period is shorter than the second threshold time period (NO in STEP S213), in STEP S113, it is determined whether any transition command has been received through an operating IF. In a case where any transition command has not been received (NO in STEP S113), the power saving process returns to STEP S213.

In a case where the idle time period is equal to or longer than the second threshold time period (YES in STEP S213), in STEP S221, the operating IFs after STEP S212 are listed on the display unit 42 of the operation panel 40 as shown in FIG. 10B, and operating IFs to be power cutoff targets are inquired to the user. If there is no operating IF to be a power cutoff target at the timing of STEP S221, the power saving process proceeds to STEP S122 without performing user's confirmation and cutting off power supply. After a confirmation result is input, in STEP S222, the supply of power to the selected operating IF is cut off (one example of a second change process).

After STEP S222, in STEP S122, it is determined whether any transition command has been received through an operating IF. In a case where any transition command has not been received (NO in STEP S122), the power supply controller 53 stands by until any transition command is received.

In a case where a transition command has been received (YES in STEP S104, STEP S113, or STEP S122), in STEP S123, the supply of power to the image forming unit 1, the image reading unit 2, the control unit 30, and all IFs for return restarts. Therefore, transition to the ready mode is performed. After STEP S123, the power saving process finishes.

According to the power saving mode of the second exemplary embodiment, in the power saving mode, the power supply destinations are changed in a plurality of stages. For example, immediately after the transition to the power saving mode, the supply of power to the image forming unit 1 and the image reading unit 2 is cut off. Meanwhile, the supply of power to the IFs for return continues. Then, if the idle time period is equal to or longer than the first threshold time period, the operating IFs are listed as shown in FIG. 10A, so as to make the user select an operating IF to be a power cutoff target. Next, if the idle time period is equal to or longer than the second threshold time period, the operating IFs are listed again as shown in FIG. 10B, so as to make the user select an operating IF to be a power cutoff target. As described above, in the power saving mode of the second exemplary embodiment, the number of operating IFs is reduced according to the length of the idle time period. Therefore, it is possible to reduce the power consumption of the entire apparatus.

Incidentally, in the second exemplary embodiment, two threshold time periods (the first threshold time period and the second threshold time period) are provided and user's selection is performed twice. However, the number of times of user's selection is not limited to twice. For example, the user's selection may be performed three or more times.

As described above, the MFP 100 of each exemplary embodiment has the plurality of interfaces capable of receiving a transition command. Further, when the MFP 100 operates in the power saving mode, the status of the supply of power to the IFs for return is changed. Specifically, the power supply destinations are changed at two or more stages, to reduce the amount of power supply. In other words, the MFP 100 does not suddenly stop the supply of power to all IFs for return, but reduces the number of IFs for return in stages, so as to gradually reduce the amount of power supply to the IFs for return. Therefore, it is possible to avoid usability getting worse suddenly. Further, since the power consumption is reduced in stages, electric power is saved.

[Modifications to Exemplary Embodiments]

The above-described exemplary embodiments are merely examples, and do not limit the present invention. Therefore, the present invention can be improved and modified in various forms without departing from the scope. For example, the present invention is not limited to the MFP, but is applicable to any apparatuses having an image forming function or an image reading function, such as a printer, a copy machine, a scanner, and a FAX.

In the above-described exemplary embodiments, when the MFP 100 operates in the power saving mode, the number of IFs for return is reduced in stages, such that the amount of power supply is gradually reduced. However, the present invention is not limited thereto. In other words, as long as the power supply destinations are changed to reduce the amount of power supply in stages, the process of changing the power supply destinations is not limited to a reduction in the number of operating IFs. For example, the power consumption of each IF for return may be stored, and a combination of IFs for return to be power supply destinations may be changed such that the amount of power supply is reduced. For example, in a case where there are a high-power-consumption IF (A) for return and a low-power-consumption IF (B) for return, it is possible to reduce the amount of power supply by changing the power supply destination from the IF (A) for return to the IF (B) for return, without reducing the number of operating IFs.

In the above-described exemplary embodiments, the power supply controller 53 manages the supply of power to all IFs for return. However, the present invention is not limited thereto. For example, a dedicated board for managing power supply may be provided for each IF for return. In this case, if there is an operating IF, power is supplied even to a dedicated board corresponding to that operating IF, such that an input of a transition command is monitored. On the other hand, if there is an idle IF, supply of power to a dedicated board corresponding to that idle IF is cut off. In the power saving mode, the supply of power to units other than the operating IF and its dedicated board is cut off. At this time, the supply of power to the control unit 30 is also cut off. The supply of power to the operating IFs is cut off according to the idle time period, the priorities, or the like. If an operating IF receives a transition command, the supply of power to all units including the control unit 30 restarts.

In the above-described exemplary embodiments, the idle time period is defined as the duration when the MFP 100 is not used (that is, a time period elapsed from when the MFP 100 has been lately used, for example, when printing or panel operation has been lately performed), and the IFs for return to be power supply destinations are changed according to the length of the idle time period. However, the present invention is not limited thereto. For example, if switching from the ready mode to the power saving mode is performed, time measurement may start, and the IFs for return to be power supply destinations may be changed according to the length of the measured time.

In the above-described exemplary embodiments, the IFs for return to be power supply destinations are changed according to the length of the idle time period. However, the condition for changing the IFs for return to be power supply destinations is not limited to the length of the idle time period. For example, the condition for changing the IFs for return to be power supply destinations may be the number of information processing apparatuses which are connected through the operating IFs. In this case, for example, the number of information processing apparatuses may be stored for each priority, and the IFs for return to be power supply destinations may be changed such that the number of information processing apparatuses decreases, the power consumption of the IFs for return decreases.

What is claimed is:

1. An image forming apparatus comprising:
    an image forming unit configured to form an image;
    a power supply controller configured to control the image forming apparatus to operate in a normal mode, in which supply of power to the image forming unit is performed, and a power saving mode, in which an amount of power to consume in the image forming apparatus is less than in the normal mode, wherein the power supply controller is configured to be switched between the power saving mode and the normal mode;
    a plurality of interfaces configured to receive a transition command for transitioning from the power saving mode to the normal mode; and
    a memory configured to store: each of the plurality of interfaces in association with respective priority groups, and threshold time periods in association with the respective priority groups,
    wherein the power supply controller is configured to perform operations comprising:
        performing an interface-power supply process of further supplying power to at least one interface among the plurality of interfaces, wherein the at least one interface to which the power is supplied functions as an interface for return that is configured to, upon receiving the transition command, cause the power supply controller to control the image forming apparatus to transition from the power saving mode to the normal mode;
        assigning each of the plurality of interfaces into respective priority groups according to a frequency of use of each of the plurality of interfaces and storing the priority groups in association with the respective interfaces in the memory, wherein the respective priority groups of the each of the plurality of interfaces are updated according to the frequency of use of each of the plurality of interfaces;
        determining whether a duration when the image forming apparatus is not used exceeds a first threshold time period;
        determining the priority corresponding to the first threshold time period stored in the memory in response to determining that the duration exceeds the first threshold time period;
        determining the interface corresponding to the determined priority that corresponds to the first threshold time period stored in the memory;
        performing a first change process of changing power supply destinations in the interface-power supply process based on the determined interface so as to reduce an amount of power supply in the interface-power supply process;
        after performing the first change process, determining whether the duration exceeds a second threshold time period;
        determining the priority corresponding to the second threshold time period stored in the memory in response to determining that the duration exceeds the second threshold time period;
        determining the interface corresponding to the determined priority that corresponds to the second threshold time period stored in the memory; and
        performing a second change process of changing the power supply destinations in the interface-power supply process based on the determined interface after the first change process so as to further reduce the amount of power supply as compared to the amount of power supply after the first change process.

2. The image forming apparatus according to claim 1, wherein a priority of a lately used interface stored in the memory is updated to higher priority than priorities of other interfaces.

3. The image forming apparatus according to claim 1, wherein the first threshold time period is shorter than a time period obtained by subtracting the first threshold time period from the second threshold time period.

4. The image forming apparatus according to claim 1, wherein at least one of the first threshold time period and the second threshold time period is updated according to a frequency of use of the image forming apparatus.

5. The image forming apparatus according to claim 1, wherein the power supply controller reduces the number of interfaces that receive power in the interface-power supply process by the first change process, and
wherein the power supply controller further reduces the number of interfaces that receive power in the interface-power supply process by the second change process.

6. The image forming apparatus according to claim 1, wherein in at least one of the first change process and the second change process, the power supply controller allows a user to select interfaces to receive power in the interface-power supply process so as to reduce the total amount of power to be supplied in the interface-power supply process.

7. The image forming apparatus according to claim 6, wherein the power supply controller allows the user to reduce the number of interfaces that receive power in the interface-power supply process in the first change process, and
wherein the power supply controller allows the user to further reduce the number of interfaces that receive power in the interface-power supply process in the second change process.

8. The image forming apparatus according to claim 1, wherein the first threshold time period and the second threshold time period are set for respective priority groups such that the first threshold time period and the second threshold time period increase as priority decreases.

9. The image forming apparatus according to claim 1, wherein the power supply controller is configured to reduce the amount of power supply in the interface-power supply process by stopping the supply of power to the determined interface.

10. An image reading apparatus comprising:
    an image reading unit configured to read an image;
    a power supply controller configured to control the image reading apparatus to operate in a normal mode, in which supply of power to the image reading unit is performed, and a power saving mode, in which an amount of power consumed in the image reading apparatus is less than in the normal mode, wherein the power supply controller is configured to be switched between the power saving mode and the normal mode;

a plurality of interfaces configured to receive a transition command for transitioning from the power saving mode to the normal mode; and a memory configured to store: each of the plurality of interfaces in association with respective priority groups, and threshold time periods in association with the respective priority groups, wherein the power supply controller is configured to perform operations comprising:

performing an interface-power supply process of further supplying power to at least one interface among the plurality of interfaces, wherein the at least one interface to which the power is supplied functions as an interface for return that is configured to, upon receiving the transition command, cause the power supply controller to control the image forming apparatus to transition from the power saving mode to the normal mode;

assigning each of the plurality of interfaces into respective priority groups according to a frequency of use of each of the plurality of interfaces and storing the priority groups in association with the respective interfaces in the memory, wherein the respective priority groups of the each of the plurality of interfaces are updated according to the frequency of use of each of the plurality of interfaces;

determining whether a duration when the image forming apparatus is not used exceeds a first threshold time period;

determining the priority corresponding to the first threshold time period stored in the memory in response to determining that the duration exceeds the first threshold time period;

determining the interface corresponding to the determined priority that corresponds to the first threshold time period stored in the memory;

performing a first change process of changing power supply destinations in the interface-power supply process based on the determined interface so as to reduce an amount of power supply in the interface-power supply process;

after performing the first change process, determining whether the duration exceeds a second threshold time period;

determining the priority corresponding to the second threshold time period stored in the memory in response to determining that the duration exceeds the second threshold time period;

determining the interface corresponding to the determined priority that corresponds to the second threshold time period stored in the memory; and performing a second change process of changing the power supply destinations in the interface-power supply process based on the determined interface after the first change process so as to further reduce the amount of power supply as compared to the amount of power supply after the first change process.

11. The image reading apparatus according to claim 10, wherein a priority of a most recently used interface stored in the memory is updated to higher priority than priorities of other interfaces.

12. The image reading apparatus according to claim 10, wherein the first threshold time period is shorter than a time period obtained by subtracting the first threshold time period from the second threshold time period.

13. The image reading apparatus according to claim 10, wherein at least one of the first threshold time period and the second threshold time period is updated according to a frequency of use of the image forming apparatus.

14. The image reading apparatus according to claim 10, wherein the power supply controller reduces the number of interfaces that receive power in the interface-power supply process by the first change process, and wherein the power supply controller further reduces the number of interfaces that receive power in the interface-power supply process by the second change process.

15. The image reading apparatus according to claim 10, wherein in at least one of the first change process and the second change process, the power supply controller allows a user to select interfaces to receive power in the interface-power supply process so as to reduce the total amount of power to be supplied in the interface-power supply process.

16. A multi-function peripheral comprising:

an image forming unit configured to form an image;

an image reading unit configured to read an image;

a power supply controller configured to control the multi-function peripheral to operate in a normal mode, in which supply of power to the image forming unit and the image reading unit is performed, and a power saving mode, in which an amount of power consumed in the multi-function peripheral is less than in the normal mode;

a plurality of interfaces configured to receive a transition command for transitioning from the power saving mode to the normal mode; and a memory configured to store: each of the plurality of interfaces in association with respective priority groups, and threshold time periods in association with the respective priority groups, wherein the power supply controller is configured to perform operations comprising:

performing an interface-power supply process of further supplying power to at least one interface among the plurality of interfaces, wherein the at least one interface to which the power is supplied functions as an interface for return that is configured to, upon receiving the transition command, cause the power supply controller to control the image forming apparatus to transition from the power saving mode to the normal mode;

assigning each of the plurality of interfaces into respective priority groups according to a frequency of use of each of the plurality of interfaces and storing the priority groups in association with the respective interfaces in the memory, wherein the respective priority groups of the each of the plurality of interfaces are updated according to the frequency of use of each of the plurality of interfaces;

determining whether a duration when the image forming apparatus is not used exceeds a first threshold time period;

determining the priority corresponding to the first threshold time period stored in the memory in response to determining that the duration exceeds the first threshold time period;

determining the interface corresponding to the determined priority that corresponds to the first threshold time period stored in the memory;

performing a first change process of changing power supply destinations in the interface-power supply process based on the determined interface so as to reduce an amount of power supply in the interface-power supply process;

after performing the first change process, determining whether the duration exceeds a second threshold time period;

determining the priority corresponding to the second threshold time period stored in the memory in response to determining that the duration exceeds the second threshold time period;

determining the interface corresponding to the determined priority that corresponds to the second threshold time period stored in the memory; and performing a second change process of changing the power supply destinations in the interface-power supply process based on the determined interface after the first change process so as to further reduce the amount of power supply as compared to the amount of power supply after the first change process.

* * * * *